United States Patent [19]

Maus et al.

[11] Patent Number: 5,157,010
[45] Date of Patent: Oct. 20, 1992

[54] METALLIC HONEYCOMB AS CATALYST CARRIER WITH MICROSTRUCTURES FOR FLOW MIXING

[75] Inventors: Wolfgang Maus, Bergisch Gladbach; Ludwig Wieres, Overath, both of Fed. Rep. of Germany

[73] Assignee: Emitec Gesellschaft Fur Emissionstechnologie mbH, Lohmar, Fed. Rep. of Germany

[21] Appl. No.: 731,523

[22] Filed: Jul. 17, 1991

Related U.S. Application Data

[63] Continuation of PCT/EP90/00086, Jan. 16, 1990.

[30] Foreign Application Priority Data

Jan. 17, 1989 [DE] Fed. Rep. of Germany ... 8900467[U]

[51] Int. Cl.$^5$ .......................... B01J 32/00; B01J 35/04
[52] U.S. Cl. ..................... 502/439; 502/527; 428/593
[58] Field of Search ............... 502/439, 527; 428/593

[56] References Cited

U.S. PATENT DOCUMENTS 4,845,073 7/1989 Cyron .............................. 502/527 X

FOREIGN PATENT DOCUMENTS 0136515 11/1987 European Pat. Off. .
0298943 1/1989 European Pat. Off. .
2001547 2/1979 United Kingdom .
2040179 8/1980 United Kingdom .

Primary Examiner—W. J. Shine
Attorney, Agent, or Firm—Herbert L. Lerner; Laurence A. Greenberg

[57] ABSTRACT

A metallic honeycomb body, such as a catalyst carrier body for the exhaust system of a motor vehicle, includes sheet metal layers at least partly having at least one macrostructure forming a plurality of channels for conveying a fluid in a given flow direction. The at least one macrostructure determines a shape of the honeycomb body, an average channel width and essential mechanical properties of the honeycomb body. At least a part of the sheet metal layers have at least partial regions with microstructures. The microstructures have a height being substantially from 0.01 to about 0.3 times the average channel width and being at least 15 μm. The microstructures extend transversely or at an angle relative to the given flow direction and are spaced substantially from 1-10 mm apart from each other in the given flow direction.

28 Claims, 3 Drawing Sheets

5,157,010

METALLIC HONEYCOMB AS CATALYST CARRIER WITH MICROSTRUCTURES FOR FLOW MIXING

CROSS-REFERENCE TO RELATED APPLICATION

This application is a continuation of PCT application Ser. No. PCT/EP90/00086, filed Jan. 16, 1990.

The present invention relates to a metallic honeycomb body or structure, preferably for use as a catalyst carrier body or support in motor vehicles.

From the prior art, diverse forms of metallic honeycomb bodies are known in which aspects of the mechanical stability and the shape of individual channels primarily occupy a prominent position for the purpose of shaping individual sheet metal layers which form such a honeycomb body. Added thereto are production-engineering questions and aspects of increasing effective surfaces. Corresponding honeycomb bodies are described, for example, in European Patent No. 0 159 468 B1, Published European Patent Application No. 0 220 468 A1, Published European Patent Application No. 0 245 737 A1 and European Patent No. 0 245 738 B1.

There are also diverse macroscopic structures which should modify a macroscopic mixing of a flow in a honeycomb body, for example by connecting openings between the individual channels or by using two sheet metal layers that are situated on top of one another and corrugated at an angle relative to one another.

In European Patent No. 0 136 515 B1 it has also already been proposed for a spiral honeycomb body wound from alternating layers of smooth and corrugated sheet metal layers to provide a smooth strip having a microstructure roughly transversely to the flow direction. The present invention is based on that prior art, which was originally intended to assist the production and soldering of such honeycomb bodies. The investigation of the effect of such structures on the flow has in fact shown that in such a case an additional effect occurs which assists the microscopic mixing of the flow in the individual channels.

Such an effect is also mentioned in Published European Patent Application No. 0 298 943 A2, which describes positive joints between the smooth and corrugated sheet metal layers of spirally wound bodies. However, a systematic utilization of that effect is not provided.

It is accordingly an object of the invention to provide a metallic honeycomb body and preferably a catalyst carrier body with microstructures for flow mixing, which overcomes the hereinafore-mentioned disadvantages of the heretofore-known devices of this general type and which utilizes the effect of microstructures on the microscopic mixing in the individual channels of a honeycomb body in a particularly beneficial way and thereby increases the catalytic effectiveness. At the same time, the mechanical properties of the honeycomb body should be beneficially modified.

With the foregoing and other objects in view there is provided, in accordance with the invention, a metallic honeycomb body, comprising sheet metal layers at least partly having at least a first macrostructure forming a plurality of channels for conveying a fluid in a given flow direction, the at least one macrostructure determining a shape of the honeycomb body, an average channel width and essential or important mechanical properties of the honeycomb body, and at least a part or some of the sheet metal layers having at least partial regions with microstructures, the microstructures having a height being substantially from 0.01 to about 0.3 times the average channel width and being at least 15 $\mu$m, the microstructures extending transversely or at an angle relative to the given flow direction and being spaced substantially from 1–10 mm apart from each other in the given flow direction.

In this connection, this construction is based on the following discoveries: due to the large number of channels per cross-sectional unit (usually 200 to 500 channels per square inch), honeycomb bodies for catalysts already have a large internal surface area with respect to the total volume of the body. Effective catalysis requires, inter alia, as large a catalyst surface area as possible. The effective surface increases as a result of applying a layer of aluminum oxide, usually by more than three orders of magnitude. This is due to the rough and fissured crystalline surface structure lying in the micrometer region. Additionally, however, an active exchange of the flow regions near the wall with the core flow is of importance for an effective catalytic conversion (cf. FIG. 7). The turbulent, and in particular, the laminarly structured flow profile in a channel of a honeycomb body exhibits markedly decreasing velocities in the direction of the wall in the transition region. Although the exchange in the vicinity of the wall increases if the gas velocity as a whole is increased, higher throttling losses in the honeycomb body and a lower dwell time of the gas in the catalytically active region have to be accepted. Due to its uniform roughness in the region of 10 $\mu$m, the rough surface of the aluminum oxide does not itself produce exceptional transverse mixing. However, with its closely spaced additional microstructures of the individual sheet metal layers, which microstructures are markedly larger than the roughness of the aluminum oxide but markedly smaller than the channel width, the present invention makes it possible to substantially improve the microscopic flow conditions in each channel, in particular in the vicinity of the wall. The flow losses hardly increase as a result, but the numerous microscopic projections in the channel walls produce a local increase in gas velocity and the pressures produce a local deceleration of the gas velocity.

In accordance with another feature of the invention, the sheet metal layers are alternating smooth and corrugated sheet metal layers, or layers of differently corrugated sheet metal layers, and at least some of the corrugated metal sheets have the second microstructures.

Since the corrugated sheet metal layers form the majority of the channel walls in honeycomb bodies made of alternating smooth and corrugated sheet metal layers, it is particularly advantageous to provide the corrugated sheet metal layers with a microstructure. It has been found that it is possible to corrugate sheet metal layers provided with such microstructures without difficulty, and indeed, under some circumstances the corrugation and a microstructure can be produced in a single operation. It will, in general, be sensible to provide all of the channel walls with continuous microstructures, at least in partial regions.

After what has been said, the precise shape of the microstructures is not particularly important. Therefore, in accordance with a further feature of the invention, the microstructures are grooves, beads, nubs, channels or the like which extend transversely to, or at an angle to, the flow direction and project out of the sheet metal plate surface to one or both sides. Of course, a structuring towards both sides of the sheet metal plates is sensible, in order to modify all of the channels equally. The microstructures do not, of course, need to extend uninterruptedly over the individual sheet metal plates, but they may also extend with interruptions and in an offset manner with respect to one another.

For a component of the boundary flow in the direction towards the core flow, it is not of decisive importance that the microstructure is precisely transverse to the flow direction. Therefore, in accordance with an added feature of the invention, the microstructures extend at an angle of substantially from 75° to 105° and preferably about 90 relative to the given flow direction.

If it is not desired to achieve only one component of the boundary flow in the direction of the core flow but to produce a spin overall in every individual channel then, in accordance with an additional feature of the invention, the microstructures form an angle of $\pm(15°$ to 75°) and preferably about 45° relative to the flow direction. Such a pattern produces both a component of the boundary flow in the direction of the core flow and also, overall, a spin in the boundary flow, both of which result in an improved mixing.

In order to produce a particularly effective spin in each channel, in accordance with yet another feature of the invention, two of the sheet metal plates lie on top of one another with microstructures having the same angle relative to the flow direction but with reversed sign. In this case, the two microstructures of the sheet metal plates forming a channel supplement one another to form a helical microstructure which particularly assists a spin.

In accordance with yet a further feature of the invention, the microstructures have an extent or length in the flow direction of 0.05 to 8 mm, and preferably about 0.5 to 3 mm.

The size of the channel of the honeycomb body is of importance for the height of the microstructure. Preferably, in accordance with yet an added feature of the invention, the second microstructures have a height from about 0.05 to 0.1 times the average width of the channels, which has been found to be beneficial.

In accordance with yet an additional feature of the invention, the microstructures have a mutual spacing in the flow direction of between 1 and 10 mm, preferably from 2-8 mm and in particular from 4-6 mm.

A microstructure is not necessarily troublesome when layering or winding sheet metal layers, as might initially be expected, but may even develop additional mechanical effects in an advantageous manner. In accordance with again another feature of the invention, a form-locking connection or intermeshing of these structures in contact regions of the sheet metal plates during winding, layering or intertwining is achieved by adjusting the shapes, spacings and arrangements or locations of the microstructures on the sheet metal plates, as a result of which both a subsequent soldering of contact regions is possible without difficulty and an additional mechanical strength of the entire honeycomb body is achievable. A form-locking connection is one which connects two elements together due to the shape of the elements themselves, as opposed to a force-locking connection, which locks the elements together by force external to the elements. The microstructures may also partially compensate for length extensions of the sheet metal plates.

In accordance with a concomitant feature of the invention, the honeycomb body is a catalyst carrier body, such as for the exhaust system of a motor vehicle.

The production of the microstructures is possible in diverse manners. They can be applied, for example, between a profiled steel roll and a rubber roll or between two correspondingly profiled, meshing steel rolls. Impressing structures in discontinuous processes is also possible. The microstructures are in general still so small that the plastic deformability of the sheet metal plates is adequate for their production.

Other features which are considered as characteristic for the invention are set forth in the appended claims.

Although the invention is illustrated and described herein as embodied in a metallic honeycomb body and preferably a catalyst carrier body with microstructures for flow mixing, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 1:
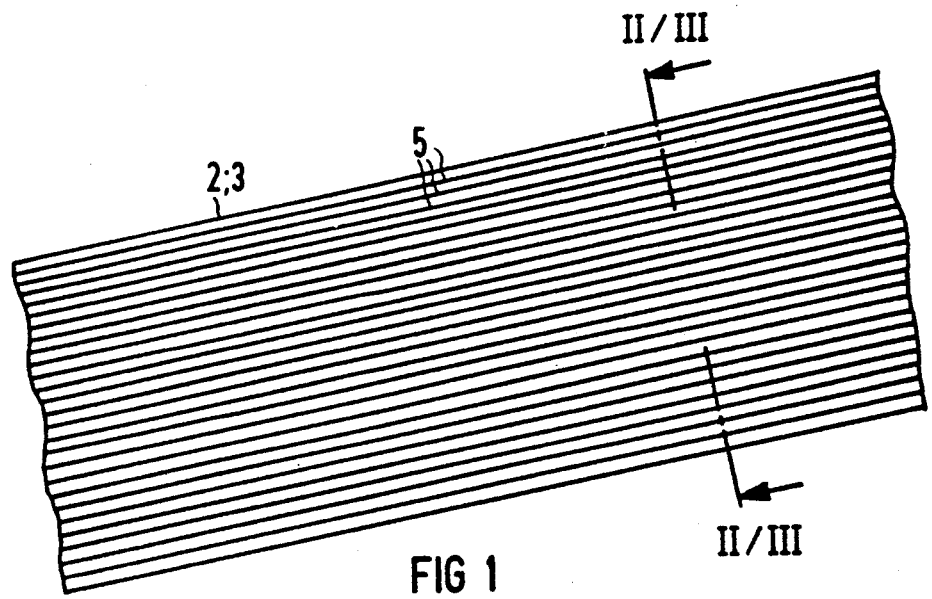
FIG. 1 is a fragmentary, diagrammatic, elevational view of a sheet metal strip provided with microstructures.

Referring now to the figures of the drawing in detail and first, particularly, to FIG. 1 thereof, there is seen a portion of a sheet metal strip or layer 2 or 3 which has a microstructure 5 extending in its longitudinal direction, i.e. transversely to its subsequent flow direction.

Figure 2:
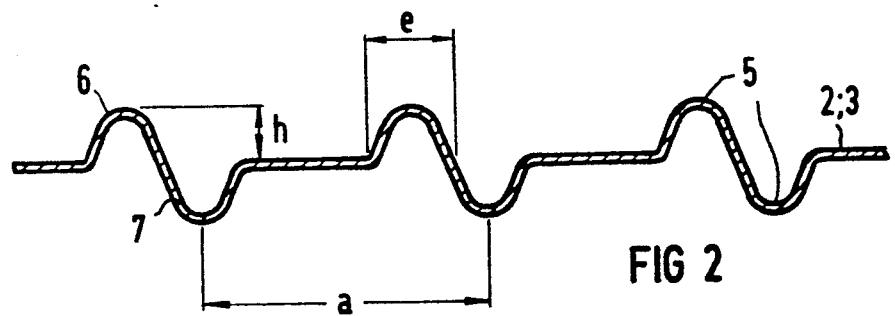
FIG. 2 is a fragmentary, cross-sectional view of one structural variant of such a sheet metal strip, taken along the line II—II of FIG. 1, in the direction of the arrows.

FIG. 2 shows a cross section taken along the line II/III—II/III in FIG. 1, which is specifically one of many possible variants of a microstructure 5 according to the invention. A sheet metal strip, layer or plate 2 or 3 has many beads in the form of hills 6 and valleys 7 extending roughly in parallel, at a spacing a from one another which may be from 1-10 mm, and for example about 2 mm. An extension e in the flow direction of an individual hill 6 or valley 7 of the microstructure may be, for example, about 0.1 to 0.5 mm The maximum height h of the microstructure with respect to the surface of the sheet metal strip or metal sheet or layer 2 or 3 should be a fraction of the average width of a channel in the honeycomb body, for example about 0.05 times.

In absolute terms, this may be, for example, a height of 15-100 μm.

Figure 3:
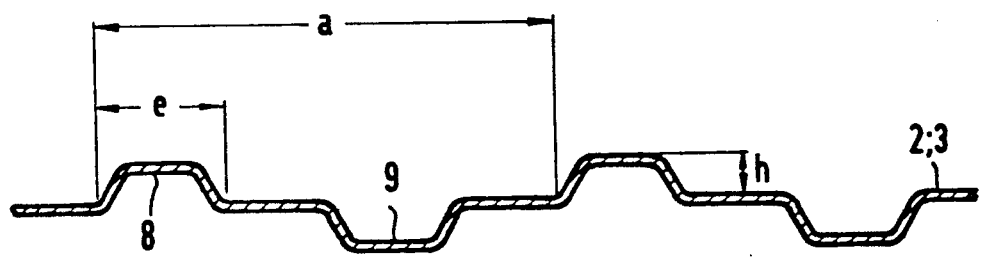
FIG. 3 is a fragmentary, cross-sectional view illustrating another microstructure, taken along the line III—III of FIG. 1, in the direction of the arrows.

FIG. 3 shows another variant of the microstructure in which individual projections 8 and depressions 9 have the shape of impressed channels or grooves.

Figure 4:
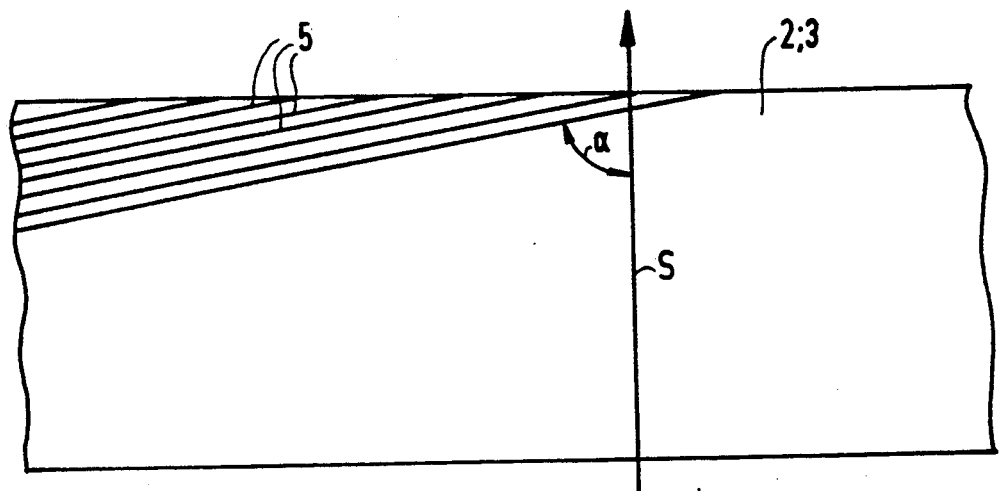
FIG. 4 is a fragmentary, elevational view of a sheet metal strip having a microstructure lying at an angle relative to the flow direction.

FIG. 4 shows that the microstructure 5 on a sheet metal strip or layer 2 or 3 may form an angle alpha relative to the subsequent flow direction s. For an effective transverse mixing, the microstructure need not extend transversely to the flow direction, but it may deviate from the flow direction by about 15 .

Figure 5:
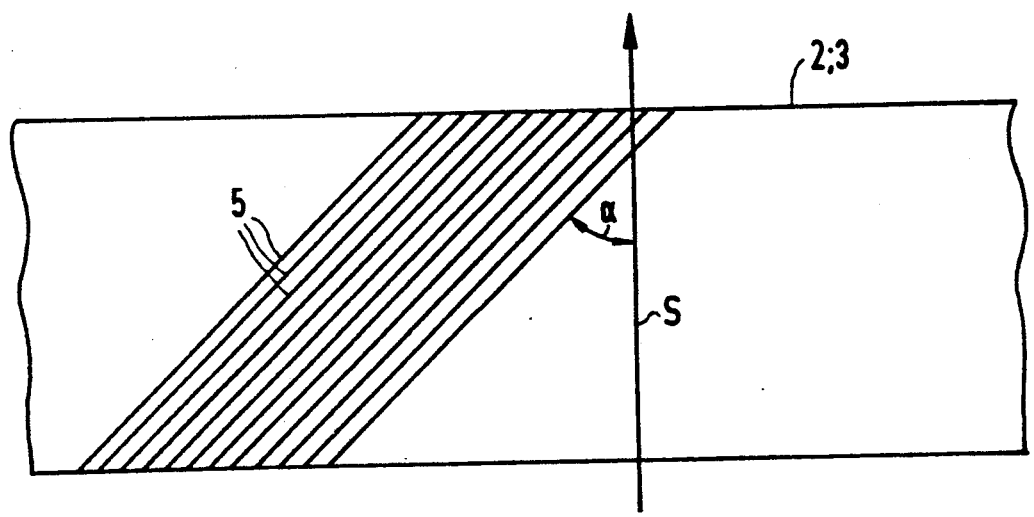
FIG. 5 is a fragmentary, elevational view of a sheet metal strip having a microstructure position suitable for producing spin.

FIG. 5 diagrammatically shows that, for a specific purpose, a smaller angle between the microstructure 5 on a sheet metal strip or layer 2 or 3 with respect to the subsequent flow direction s is also suitable. In order to produce a spin in every individual flow channel, the angle alpha may be, for example, about 45°, in which case this range of angles may also be between ±(15° to 75°) depending on the dimensions of the channel and the flow velocity therein.

Figure 6:
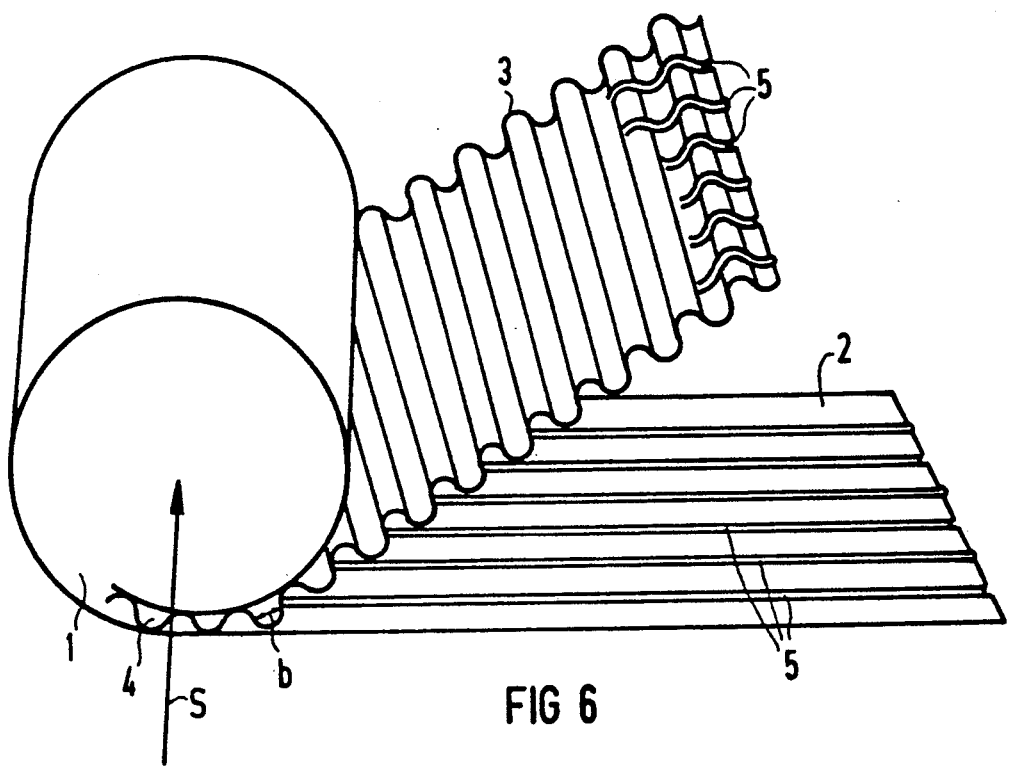
FIG. 6 is a perspective view of an almost completely wound honeycomb body having microstructures according to the invention.

FIG. 6 shows a honeycomb body 1 in a state shortly before completion. The honeycomb body 1 includes a macroscopically smooth sheet metal strip or layer 2 which has a microstructure 5 extending transversely to the flow direction s and a macroscopically corrugated sheet metal strip or layer 3 which additionally has a microstructure 5 transverse to the flow direction s. An average width b of individual channels 4 is indicated. In general, the average channel width b is about the same size as the average corrugation height of the first macrostructure, if the first macrostructure is a corrugation which is produced, for example, by involute toothed wheels. The size of the second microstructure could therefore also be based on the corrugation height. However, there are macrostructures in which neither the corrugation height nor an average channel width can be defined precisely for the entire structure. For such cases, to which the present invention is also applicable, the average channel width should be understood to mean the average distance between two similarly structured sheet metal layers. For simple structures this corresponds to the predominant corrugation height. Spirally wound catalyst carrier bodies are only one variant of many possibilities for which the present invention can find application. In the same way, the microstructures are suitable for improving honeycomb bodies including layered or intertwined sheet metal strips or layers, such as are known according to the prior art.

Figure 7:
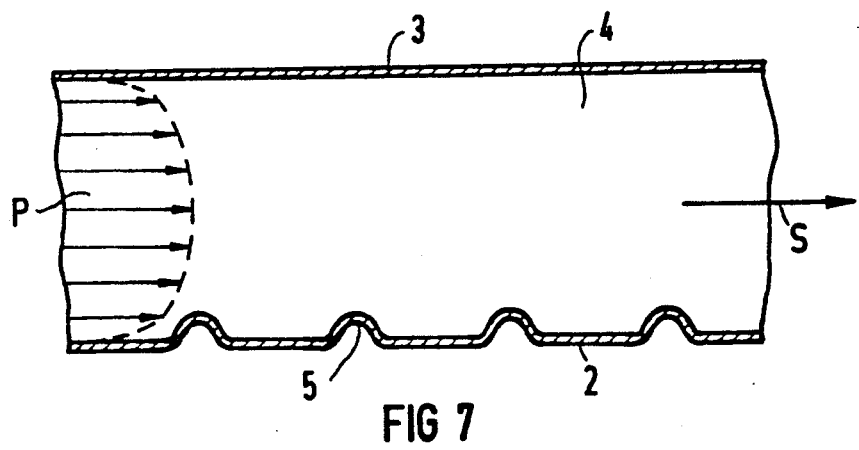
FIG. 7 is a fragmentary, elevational view showing an illustration of flow conditions in a single channel.

FIG. 7 shows a flow profile p in an individual channel 4 of a honeycomb body. In a boundary region of the channel, the flow is comparatively slow and, in the case of laminar flow, an exchange with the core flow in the center of the channel hardly takes place. The metal sheet or layer 3, which is not provided with a microstructure for the purpose of illustration and partially bounds the channel 4, does not modify this flow profile. However, the metal sheet or layer 2 provided with a microstructure 5 produces a mixing of the flow precisely in the catalytically effective boundary region, although without considerably increasing the pressure loss in the channel 4.

The present invention increases the catalytic conversion in an exhaust gas catalyst by microscopically swirling the flow in the individual channels so that, for example, an exhaust gas catalyst of a motor vehicle can exhibit a conversion rate which is higher by a few per cent without other appreciable disadvantages.

We claim:

1. A metallic honeycomb body, comprising sheet metal layers at least partly having at least one macrostructure forming a plurality of channels for conveying a fluid in a given flow direction, said at least one macrostructure determining a shape of the honeycomb body, an average channel width and essential mechanical properties of the honeycomb body, and at least a part of said sheet metal layers having at least partial regions with microstructures, said microstructures having a height being substantially from 0.01 to about 0.3 times said average channel width and being at least 15 μm, said microstructures extending at an angle relative to said given flow direction and being spaced substantially from 1-10 mm apart from each other in said given flow direction.

2. The honeycomb body according to claim 1, wherein said microstructures extend transversely to said given flow direction.

3. The honeycomb body according to claim 1, wherein said sheet metal layers are alternating smooth and corrugated sheet metal layers, and at least some of said corrugated sheet metal layers have said microstructures.

4. The honeycomb body according to claim 1, wherein said sheet metal layers are differently corrugated sheet metal layers, and at least some of said corrugated sheet metal layers have said microstructures.

5. The honeycomb body according to claim 1, wherein said sheet metal layers have surfaces and sides, and said microstructures are grooves extending at an angle relative to said given flow direction and projecting out of the surface of said sheet metal layers toward at least one side.

6. The honeycomb body according to claim 5, wherein said grooves extend transversely to said given flow direction.

7. The honeycomb body according to claim 1, wherein said sheet metal layers have surfaces and sides, and said microstructures are beads extending at an angle relative to said given flow direction and projecting out of the surface of said sheet metal layers toward at least one side.

8. The honeycomb body according to claim 7, wherein said beads extend transversely to said given flow direction.

9. The honeycomb body according to claim 1, wherein said sheet metal layers have surfaces and sides, and said microstructures are nubs extending at an angle relative to said given flow direction and projecting out of the surface of said sheet metal layers toward at least one side.

10. The honeycomb body according to claim 9, wherein said nubs extend transversely to said given flow direction.

11. The honeycomb body according to claim 1, wherein said sheet metal layers have surfaces and sides, and said microstructures are channels extending at an angle relative to said given flow direction and projecting out of the surface of said sheet metal layers toward at least one side.

12. The honeycomb body according to claim 11, wherein said channels extend transversely to said given flow direction.

13. The honeycomb body according to claim 1, wherein said microstructures extend at an angle of substantially from 75° to 105° relative to said given flow direction.

14. The honeycomb body according to claim 1, wherein said microstructures extend at an angle of about 90° relative to said given flow direction.

15. The honeycomb body according to claim 1, wherein said microstructures extend at an angle of substantially ±15° to 75° relative to said given flow direction.

16. The honeycomb body according to claim 1, wherein said microstructures extend at an angle of substantially 45° relative to said given flow direction.

17. The honeycomb body according to claim 15, wherein said angle between said microstructures and said given flow direction is approximately equal in size but of opposite sign for two of said sheet metal layers lying on top of one another.

18. The honeycomb body according to claim 16, wherein said angle between said microstructures and said given flow direction is approximately equal in size but of opposite sign for two of said sheet metal layers lying on top of one another.

19. The honeycomb body according to claim 1, wherein said microstructures are mutually spaced apart by a spacing of substantially from 2 to 8 mm.

20. The honeycomb body according to claim 1, wherein said microstructures are mutually spaced apart by a spacing of substantially from 4 to 6 mm.

21. The honeycomb body according to claim 1, wherein said microstructures have an extent or length in said given flow direction of substantially from 0.05 to 8 mm.

22. The honeycomb body according to claim 1, wherein said microstructures have an extent or length in said given flow direction of substantially from about 0.5 to 3 mm.

23. The honeycomb body according to claim 1, wherein said microstructures have a height from substantially about 0.05 to 0.1 times said average channel width.

24. The honeycomb body according to claim 1, wherein said sheet metal layers have contact regions, all of said sheet metal layers have said microstructures, and said microstructures have shapes, spacings and locations assisting in a locking of said microstructures in said contact regions.

25. A metallic honeycomb body, comprising sheet metal layers at least partly having at least one macrostructure forming a plurality of channels for conveying a fluid in a given flow direction, said at least one macrostructure determining an average channel width of the honeycomb body, and at least a part of said sheet metal layers having at least partial regions with microstructures, said microstructures having a height being substantially from 0.01 to about 0.3 times said average channel width and being at least 15 μm, said microstructures extending at an angle relative to said given flow direction and being spaced substantially from 1-10 mm apart from each other in said given flow direction.

26. The honeycomb body according to claim 25, wherein said microstructures extend transversely to said given flow direction.

27. A honeycomb catalyst carrier body for the exhaust system of a motor vehicle, comprising sheet metal layers at least partly having at least one macrostructure forming a plurality of channels for conveying a fluid in a given flow direction, said at least one macrostructure determining a shape of the honeycomb body, an average channel width and essential mechanical properties of the honeycomb body, and at least a part of said sheet metal layers having at least partial regions with microstructures, said microstructures having a height being substantially from 0.01 to about 0.3 times said average channel width and being at least 15 μm, said microstructures extending at an angle relative to said given flow direction and being spaced substantially from 1-10 mm apart from each other in said given flow direction.

28. The honeycomb catalyst carrier body according to claim 27, wherein said microstructures extend transversely to said given flow direction.

* * * * *